April 1, 1969 — G. T. ARTHUR — 3,435,658
TYPEWRITER PLATEN TESTER
Filed Jan. 19, 1967
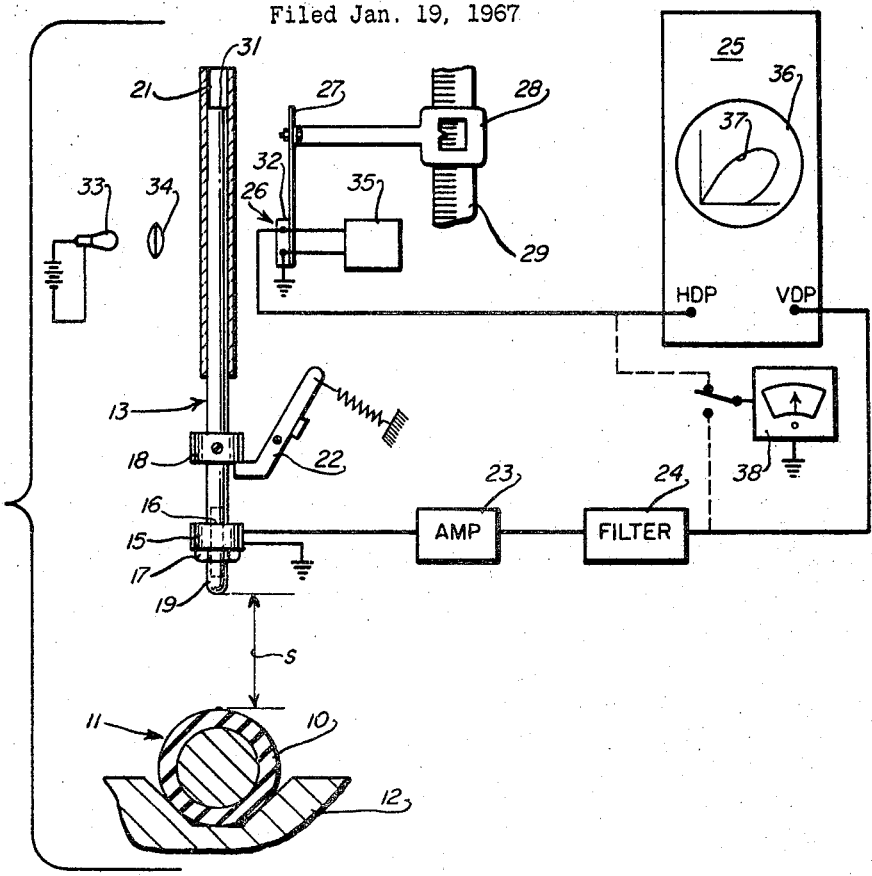
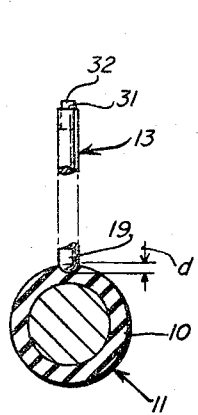
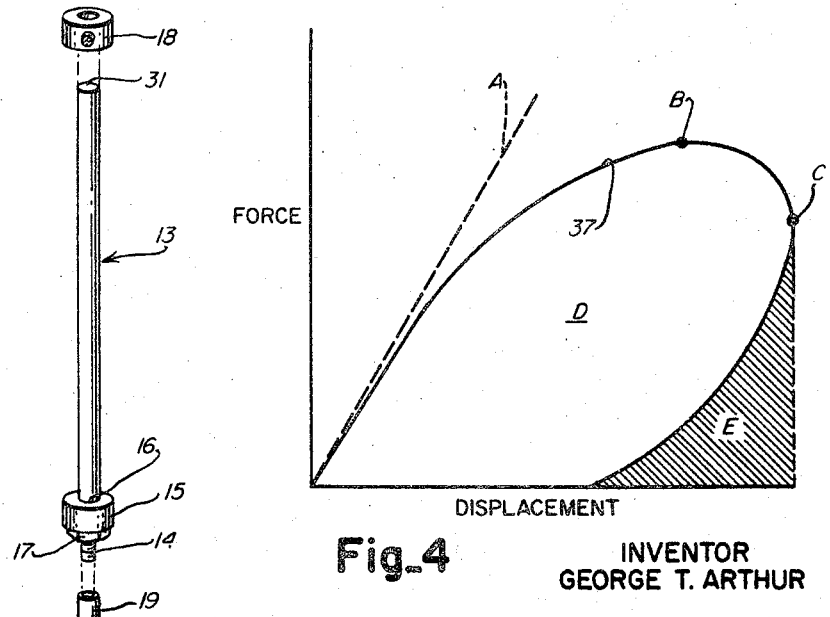
INVENTOR
GEORGE T. ARTHUR
BY Joseph R. Spalla
ATTORNEY United States Patent Office 3,435,658
Patented Apr. 1, 1969

3,435,658
TYPEWRITER PLATEN TESTER
George T. Arthur, Vernon, Conn., assignor to Royal Typewriter Company, Inc., Hartford, Conn., a corporation of Delaware
Filed Jan. 19, 1967, Ser. No. 610,282
Int. Cl. G01n 3/08
U.S. Cl. 73—12      2 Claims

ABSTRACT OF THE DISCLOSURE

An apparatus for permitting determination of dynamic characteristics such as hardness and resilience of viscoelastic materials suitable for typewriter platens by simulating conditions of usage and through recordation of measured voltages proportional to impact force and displacement applied respectively to the vertical and horizontal deflection plates of an oscilloscope. The apparatus provides for variation of velocity, energy and impact surface shape of an indentor rod to simulate a type bar impact against materials considered for use as type-writer platens.

---

This invention relates to test apparatus for determining the dynamic charatceristics of visco elastic materials; more particularly it relates to apparatus employing transducers for generating voltages proportional to impact force of an indentor rod on visco elastic platen material and to the resulting displacement of said material and for recording said voltages as a force vs. deflection record from which the characteristics of the material may be determined.

Prior to this invention, various static compression gages, Shore durometer, and Shore Sceleroscope instruments were used in attempts to qualify and to determine suitability of elastomers for platen use. Static compression gages consist of a test indentor, some form of weight and a displacement dial indicator. The test indentor is placed on the elastomer undergoing test with the weight on top of it. The penetration of the indentor into the elastomer, usually after some short interval of time, is measured with the dial indicator. The Shore durometer consists of a spring loaded test indentor which is pressed against the elastomer undergoing test. The penetration of the indentor into the elastomer is indicated upon a dial, which is linked to the spring loaded plunger. The Shore Sceleroscope consists of an indentor rod which is dropped from a fixed height upon the elastomer undergoing test. The rebound of the indentor rod after impact is measured by a dial.

The above mentioned instruments are not effective, because the resilience and hardness characteristics of visco elastic materials depends upon the instantaneous magnitudes of energy imparted to the material during the measurement and the parameters contributing to the magnitude of energy could not be controlled in these instruments. The compression gage and Shore durometer instruments are static measuring devices and the Sceleroscope, although dynamic, does not measure hardness, and the energy or velocity of impact could not be varied. None of the instruments provided a dynamic force vs. displacement record from which the instantaneous hardness and degree of resilience can be determined. Further, the shape and surface area of the indentors could not be varied without recalibration.

The invention consists of an indentor rod which is caused to impact upon the elastomer being tested. It is therefore a dynamic instrument and provision is made to vary the magnitude of the energy of the indentor. It provides a combined force vs. deflection record from which the instantaneous hardness and degree of resilience can be determined. Provision is also made for changing the shape and area of the indentor rod impact surface.

An object of the invention is to provide apparatus for measuring dynamic characteristics of visco elastic materials.

Another object of the invention is in the provision of apparatus for measuring the dynamic characteristics of visco elastic materials suitable for typewriter platens under simulated conditions of use.

A further object of the invention is to provide a force vs. displacement record for a material subjected to impact by an indentor rod having a preselected potential energy.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a partly schematic elevational view of apparatus in accordance with the invention;

FIGURE 2 is a perspective view of an indentor rod;

FIGURE 3 is a partial elevational view showing the relationship of indentor rod and solar cell at maximum displacement; and FIGURE 4 is a view showing a typical record of force vs. displacement as displayed on an oscilloscope.

Referring now to the drawings wherein like reference numerals designate like or corresponding elements and wherein a preferred embodiment is illustrated, there is shown in FIGURE 1 a viscoelastic material which in the figure comprises the outer shell 10 of a typewriter platen generally designated by reference numeral 11 whose characteristics and suitability under simulated conditions of use are to be determined. The platen 11 is supported against lateral movement in a fixture 12 on a stable platform or the like. Mounted for vertical movement above the platen is an indentor rod generally designated by reference numeral 13. The indentor rod as shown in FIGURE 2 has a threaded lower end 14 of restricted diameter whereby a force transducer, such as a piezoelectric accelerometer 15 with a central bore may be telescoped over the threaded end of the rod and held in place between the shoulder 16 formed by the restricted diameter and a nut 17 threaded thereon. The rod also carriers cylindrical weights 18 which may be adjustably positioned axially of and secured to the rod as by set screws thereby to vary the magnitude of energy of the rod at any impact velocity selected as will hereinafter appear.

The lower end of the indentor rod carries as by threading thereon indentor heads 19 of any desired surface contour to simulate for example that of a type bar.

Referring again to FIGURE 1 the indentor rod 13 is guidingly supported within a hollow transparent glass tube 21 supported by a standard (not shown). The head 19 of the indentor rod is held at a selected drop height or distance $s$ above the platen by engagement of an end of a trip or release element 22 with the mass 18 secured to the indentor rod or with an abutment secured thereto.

The trip element which is pivoted to a standard (not shown) is moved counterclockwise to release the indentor rod. The drop height of the indentor rod may be varied depending on the desired magnitude of impact velocity. Where higher impact velocities are required than can be obtained by permitting the rod to drop, compression springs or other equivalent devices, such as penumatic or hydraulic devices, solenoids or explosive devices, may be employed to "shoot" the indentor rod toward the platen 11.

The accelerometer 15 secured to the indentor rod is employed to generate a voltage proportional to the impact force exerted against the platen upon release of the indentor rod. The output of the accelerometer is coupled to an amplifier 23 whose output is filtered by a low pass filter 24 to eliminate high frequency voltage transients generated by longitudinal shock waves during impact. The output of the filter 24 is a time varying voltage which represents impact force (indentor rod mass times acceleration). This time varying voltage is applied to the vertical deflection plates of an oscilloscope 25.

A displacement transducer, generally designated by reference numeral 26, comprises, in the embodiment shown, a solar cell. The material comprising the solar cell is attached as by gluing, to a support 27 which is secured to an indicator 28 adjustably mounted on a height gage 29 supported by a standard (not shown) to facilitate positioning the solar cell relative to the upper end 31 of the indentor rod 13. The solar cell position is adjusted such that the upper end 31 of the rod, when the indentor head 19 of the rod just contacts the platen, is almost level with the upper edge 32 of light sensitive material comprising the solar cell 26 such that the indentation of the indentor rod 13 into the platen 11, which is a measure of the displacement $d$ (FIGURE 3) due to the impact force, will expose an area of the light sensitive material to light directed toward the solar cell from a direct current energized light source 33 and lens 34 through the glass tube 21.

In that the output of the solar cell is not a linear function of area exposure, the cell is connected in a bias circuit 35, to select a load line and operating points as will be understood in the art, such that its output voltage will be a linear function of the area exposed to light and thus a function of displacement of the indentor rod or of the material 10 due to the force of impact. The output of the solar cell is connected to the horizontal deflection plates of the oscilloscope.

Upon impact of the indentor rod 13 with the elastomeric material 10 of the platen 11 the time varying force and displacement voltages applied to the oscilloscope combine to form dynamic traces 37. The trace depicted in FIGURES 1 and 4 on the screen 36 of the oscilloscope represents the time interval between initial impact and rebound of the indentor rod and may be recorded by a camera whose shutter is opened over the interval to record the trace.

The peak force point B (FIGURE 4) or peak displacement point C (FIGURE 4) may also be measured individually by a calibrated peak voltmeter 38 to provide a simple approximation of the hardness or resistance to deformation of the material 10 since both force and displacement vary directly with hardness provided the drop height is held constant.

Considering the trace 37 shown in FIGURE 4 the ordinate representing instantaneous impact force in pounds and the abscissa instantaneous displacement in inches, the slope of the line A represents the initial hardness in pounds per inch. Similarly, the slope of any line which is drawn tangent to trace 37 would represent the instantaneous hardness or resistance to deformation at the point of tangency. Point B represents the maximum force occurring during the impact. Point C represents the maximum displacement of the indentor rod during impact, at which time its velocity magnitude is zero. The area D enclosed by trace 37 plus the shaded area E represents the energy expended by the visco elastic material 10 to stop the downward motion of the indentor rod 13. This energy is also equal to the kinetic energy of the indentor rod at the instant the impact is commenced. The shaded area E represents the energy returned by, or the resilience of, the visco elastic material to the indentor rod causing rebound. This energy is equal to the kinetic energy of the indentor rod at the instant the impact is concluded. The area D enclosed by trace 37 is the energy "lost" or expended during the impact in the form of internal friction, heat, noise, etc.

The ratio of shaded area E to the area D plus area E times 100, is equal to the percent resilience of the material under test. The square root of the ratio of area E to the area D plus area E is equal to the coefficient of restitution for the impact.

The invention can, because of its versatility, closely simulate the typing action of a typewriter, with respect to velocity, energy and shape or area of a type character. The invention therefore can provide the dynamic loop as pictured in FIGURE 1, under the exact conditions of a typewriter. The suitability of any elastomeric material for typewriter platen application can be determined from the trace or a photographic record of the trace.

It should be noted that the use of the accelerometer on the indentor rod, to record the impact force has several advantages over the use of a force transducer underneath the visco elastic material. Primarily, it allows considerable flexibility in the shape, thickness and mounting of the visco elastic material. A completely assembled typewriter, for example, can be placed such that the indentor rod will strike the platen and the measurement can be made with the typewriter assembled complete. Secondly, the accelerometer on the striking end of the indentor rod minimizes the time delay necessary for the shock wave to be sensed as an impact force, thereby increasing the accuracy of measurement.

In summary, the invention, in its provision for varying velocity, energy, and impact surface shape of the indentor rod, allows the measurement of the dynamic hardness and resilience of a typewriter platen under condition of usage. The use of the accelerometer on the indentor rod to generate a voltage proportional to impact force contributes greatly to the versatility of the invention. This allows the test sample of material to be of practically any shape and mounted in practically any manner. Thus slabs of elastomeric materials can be evaluated without the necessity of assembling the material into the form of a typewriter platen.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for determining the suitability of an elastomeric material for use as a typewriter platen for the dynamic characteristics it exhibits in response to a simulated type bar impact comprising, a means for supporting said elastomeric material, an indentor rod having a selected mass and an impact surface shape in the form of a type character, means releasably supporting said indentor rod with its impact surface a selected height above said elastomeric material whereby when released the impact on said material simulates that of a selected character type bar, force transducer means for generating a voltage proportional to the impact forces on the elastomeric material over the interval between impact and rebound of said indentor rod, displacement transducer means for generating a voltage proportional to the displacement of the elastomeric material over the interval between impact and rebound of said indentor rod, and an oscilloscope for displaying said voltages as a force versus displacement trace from which the dynamic characteristics of the material and its suitability for a platen material may be determined.

2. Apparatus as recited in claim 1 wherein said force transducer means comprises an accelerometer secured on said indentor rod adjacent the striking end thereof and wherein said displacement transducer comprises a photocell positioned in the shadow of said indentor rod for exposure to a light source only during indentation of said rod into said material.

References Cited

UNITED STATES PATENTS

| | | | |
|---|---|---|---|
| 1,037,596 | 9/1912 | Coppage | 73—81 |
| 2,323,724 | 7/1943 | Nadai et al. | 73—89 |
| 2,579,503 | 12/1951 | Lubin et al. | 73—101 |
| 2,759,353 | 8/1956 | Roberts | 73—81 X |
| 3,102,417 | 9/1963 | Chambers | 73—81 |
| 3,196,671 | 7/1965 | Dannis | 73—95 |

CHARLES A. RUEHL, *Primary Examiner.*

U.S. Cl. X.R.

73—82

UNITED STATES PATENT OFFICE
CERTIFICATE OF CORRECTION

Patent No. 3,435,658  April 1, 1969

George T. Arthur

It is certified that error appears in the above identified patent and that said Letters Patent are hereby corrected as shown below:

In the heading to the printed specification, lines 3 to 5, "assignor to Royal Typewriter Company, Inc., Hartford, Conn., a corporation of Delaware" should read -- assignor to Litton Business Systems, Inc., a corporation of New York --.

Signed and sealed this 7th day of April 1970.

(SEAL)
Attest:

Edward M. Fletcher, Jr.

Attesting Officer

WILLIAM E. SCHUYLER, JR

Commissioner of Patents